(12) United States Patent
James et al.

(10) Patent No.: US 11,091,275 B2
(45) Date of Patent: Aug. 17, 2021

(54) AERIAL DRONE OPERATIONS SUPPORT BASE

(71) Applicant: Droneovation, Inc., Aurora, IN (US)

(72) Inventors: Todd A. James, Aurora, IN (US); Michael W. Westerfield, Aurora, IN (US); Bryan C. James, Burlington, KY (US)

(73) Assignee: DRONEOVATION, INC., Aurora, IN (US)

( * ) Notice: Subject to any disclaimer, the term of this patent is extended or adjusted under 35 U.S.C. 154(b) by 611 days.

(21) Appl. No.: 15/331,464

(22) Filed: Oct. 21, 2016

(65) Prior Publication Data

US 2017/0113815 A1    Apr. 27, 2017

Related U.S. Application Data

(60) Provisional application No. 62/245,024, filed on Oct. 22, 2015.

(51) Int. Cl.
| | |
|---|---|
| *B64F 1/22* | (2006.01) |
| *B64F 1/36* | (2017.01) |
| *B64F 1/12* | (2006.01) |
| *B64C 39/02* | (2006.01) |
| *H01R 27/02* | (2006.01) |
| *H01R 31/06* | (2006.01) |
| *H01R 33/00* | (2006.01) |

(52) U.S. Cl.
CPC ............ *B64F 1/222* (2013.01); *B64C 39/024* (2013.01); *B64F 1/12* (2013.01); *B64F 1/362* (2013.01); *H01R 27/02* (2013.01); *H01R 31/06* (2013.01); *H01R 33/00* (2013.01); *B64C 2201/042* (2013.01); *B64C 2201/201* (2013.01)

(58) Field of Classification Search
CPC . B64F 1/222; B64F 1/12; H01R 33/00; H01R 31/06; H01R 27/02; B64C 39/024; B64C 2201/042; B64C 2201/201
See application file for complete search history.

(56) References Cited

U.S. PATENT DOCUMENTS

| | | |
|---|---|---|
| 4,401,351 A | 8/1983 | Record |
| 4,959,018 A | 9/1990 | Yamamoto et al. |
| 5,877,944 A | 3/1999 | Onizuka |

(Continued)

FOREIGN PATENT DOCUMENTS

| | | | | |
|---|---|---|---|---|
| EP | 2664539 A1 | 11/2013 | | |
| WO | WO-2013055265 A1 * | 4/2013 | ........... | B64C 39/024 |

*Primary Examiner* — Medhat Badawi
*Assistant Examiner* — Vicente Rodriguez
(74) *Attorney, Agent, or Firm* — Standley Law Group LLP

(57) ABSTRACT

Exemplary drone operations support base embodiments disclosed herein may be used to shelter, repower and/or service drones associated therewith. A drone operations support base may include an enclosure with an entryway that permits drone ingress and egress with respect to the enclosure. Drone launching/landing, drone storage and drone power source repowering areas may be associated with a given drone base. A transfer device may be provided to move drones between the various drone base areas. The transfer device may also be adapted to transfer drone power sources between the drone repowering area and drones located elsewhere within the drone base for repowering of the power sources and of the drones.

22 Claims, 10 Drawing Sheets

(56) References Cited

U.S. PATENT DOCUMENTS

| | | | |
|---|---|---|---|
| 5,902,138 A | 5/1999 | Murakami | |
| 5,995,380 A | 11/1999 | Maue et al. | |
| 6,007,374 A | 12/1999 | Sukegawa | |
| 6,224,397 B1 | 5/2001 | Nakamura | |
| 6,361,355 B1 | 3/2002 | Matsuoka et al. | |
| 6,796,808 B2 | 9/2004 | Hosoe et al. | |
| 7,249,956 B2 | 7/2007 | Ishiguro et al. | |
| 7,837,480 B2 | 11/2010 | Akahori | |
| 8,027,168 B2 | 9/2011 | Senk et al. | |
| 8,936,474 B2 | 1/2015 | Katsuse | |
| 9,429,953 B1 | 8/2016 | Miller et al. | |
| 2014/0319272 A1* | 10/2014 | Casado Magana | B64F 1/04 244/110 E |
| 2016/0001883 A1 | 1/2016 | Sanz et al. | |
| 2016/0009413 A1* | 1/2016 | Lee | B64F 1/007 701/16 |
| 2016/0039542 A1* | 2/2016 | Wang | B64F 1/20 701/2 |
| 2016/0257401 A1* | 9/2016 | Buchmueller | B64C 39/024 |
| 2016/0364989 A1* | 12/2016 | Speasl | G08G 5/0034 |
| 2017/0032686 A1* | 2/2017 | Alonso Tabares | B64C 39/024 |
| 2017/0096222 A1* | 4/2017 | Spinelli | B64C 39/024 |
| 2017/0225802 A1* | 8/2017 | Lussier | B64F 1/00 |

\* cited by examiner

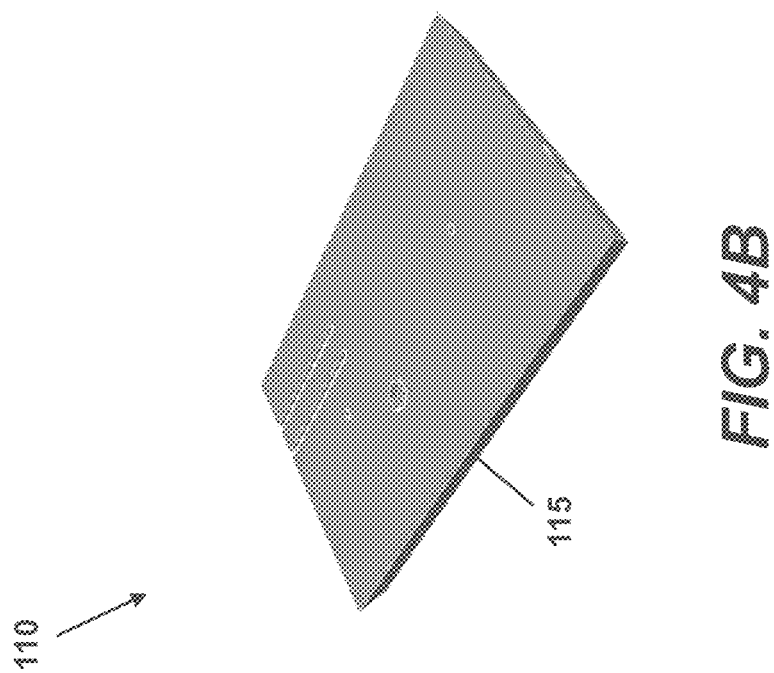
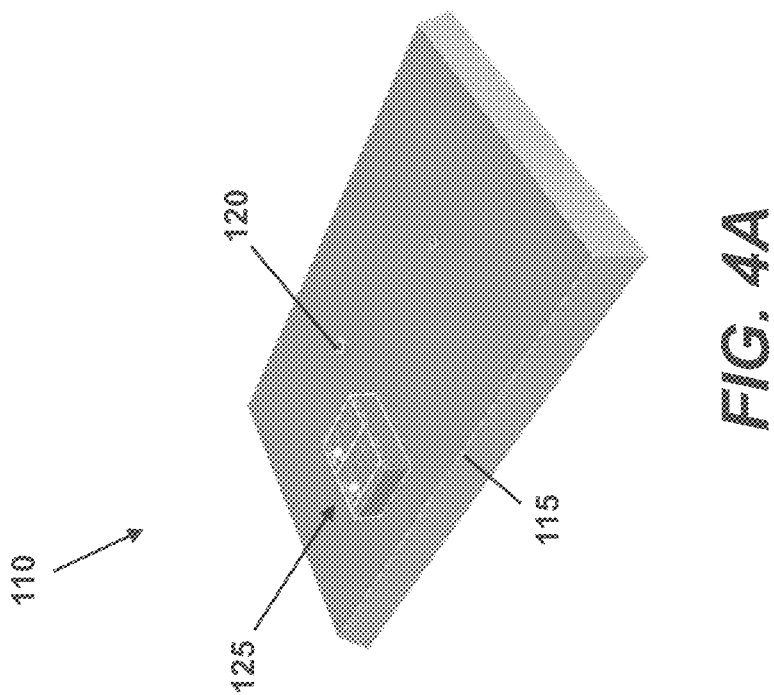

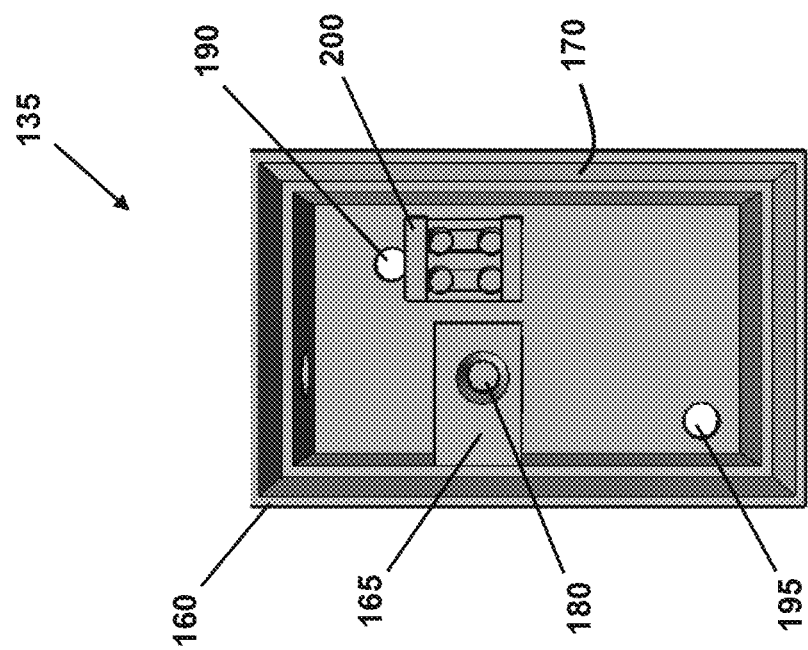
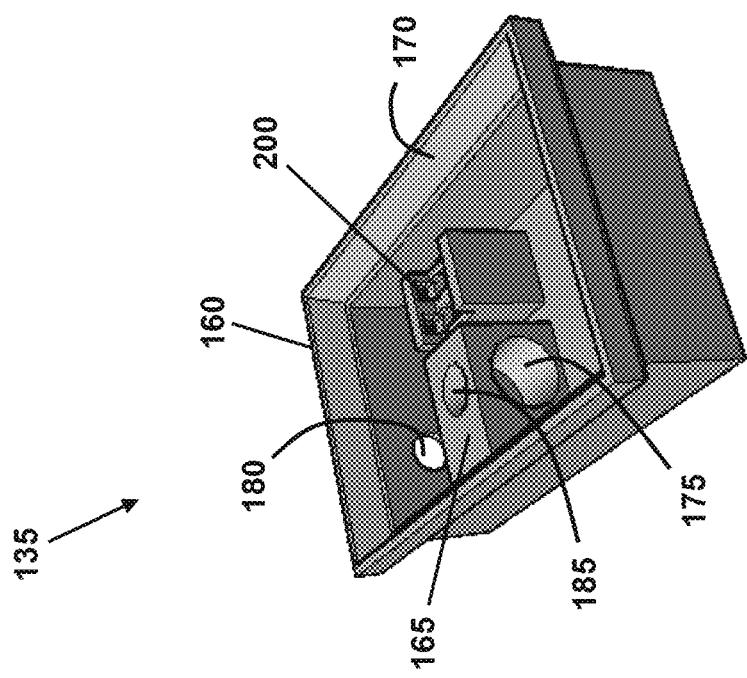
FIG. 6B
FIG. 6A

AERIAL DRONE OPERATIONS SUPPORT BASE

CROSS-REFERENCE TO RELATED APPLICATIONS

This application claims the benefit of U.S. Provisional Application No. 62/245,024, filed on Oct. 22, 2015, which is hereby incorporated by reference as if fully recited herein.

TECHNICAL FIELD

Exemplary embodiments described herein are directed to support bases for housing drones and supporting aerial drone operations.

BACKGROUND

As used herein, the term drone is intended to refer to an unmanned aerial vehicle (UAV). While the term drone may be a misnomer, at least in some cases, it has nonetheless become a common term by which the general public refers to such vehicles.

As the more formal UAV name suggests, a drone excludes an onboard human pilot. Instead, drones may be controlled remotely—such as from the ground—or may operate autonomously by way of onboard electronics and programming. Drones may vary in design and size from, for example and without limitation, large fixed-wing aircraft typically employed in military applications, to reduced scale fixed-wing aircraft and to rotor-craft such as helicopters, quadcopters, etc., which are more commonly operated by the non-military public.

The use of aerial drones is becoming increasingly popular for both recreational and non-recreational purposes. Because many drones are equipped with cameras that permit aerial views of points or events of interest, recreational drone use is on the rise. Likewise, the ability to aerially monitor property, agriculture, facilities, infrastructure, etc., has made the non-recreational use of drones increasingly popular. Non-military government use is also expected to grow, as drones may be well-suited to monitor or investigate incidents such as fires or the gathering of crowds, to track criminals, to patrol national borders, for aerial mapping, in movie-making, and even to deliver goods. A multitude of other uses are, of course, also possible.

A common trait among all drones, regardless of the particular design or use of a given drone, is the need for a power source. A drone can only stay aloft as long as the supplied power source is able to power the drone's propulsion system. Consequently, a known drone powered by liquid or gaseous fuel or by an electrical energy storage device, will typically need to periodically land and replenish or recharge its power source.

Like most mechanical devices, drones also typically require diagnostic analysis, maintenance and repair. Drones frequently include a multitude of moving parts, including for example, engines or motors, props or rotors, drive means, and servos. Drones further include various electronics which may, for example, allow for the remote or autonomous flight thereof, permit the taking of video or still images, or control other functionality with which a drone may be equipped.

From the foregoing description, it can easily be understood or envisioned that in certain cases it may be desirable to employ multiple drones, such as a fleet of drones, and to keep said drones airborne as continuously as possible. This may be particularly desirable in a military or other non-recreational setting, where the drones perform surveillance or monitoring of areas or situations that are dynamic in nature, or in the case where the drones are used to deliver goods or other items and downtime may lead to lost revenue.

Consequently, as drone use increases, there is a corresponding increasing need to provide systems and methods through which drones may be based and/or sheltered, refueled or recharged, serviced, and otherwise kept flying, in a highly efficient and flexible manner. Exemplary system and method embodiments described and shown herein are such systems and methods.

SUMMARY

Certain exemplary system and method embodiments described herein are directed to drone operating bases. These drone operating bases (also referred to herein as drone bases for brevity) may provide a location that supports the repeated takeoff and landing of multiple drones, a location where said drones may be sheltered when necessary or desired, and a location where a drone power source may be refueled, recharged, or otherwise replenished (all of which will be collectively referred to hereinafter as "repowering" a drone for purposes of simplicity and brevity). Drone operating bases and associated methods of use may also allow said multitude of drones to be serviced when needed or in accordance with a predetermined service schedule.

An exemplary drone base will generally include a structure for supporting drones during the aforementioned drone support operations. In a most simplistic embodiment, the structure may be a platform. Such an embodiment may be acceptable or appropriate in cases, for example, where the drone base will be located in an already protected or protectable location. Other exemplary drone base embodiments may include an enclosure, which may also be referred to generally herein as a hangar. A drone base hangar may be of various designs and sizes. Hangar embodiments may also include a permanently open entryway through which drones may pass during landing or launching operations. Alternatively, a hangar may be provided with an entryway that may be closed when desired, such as by a displaceable panel or the like. For example, and without limitation, a given hangar may be provided with a sliding roof panel for this purpose. As should be apparent, a drone hangar with a closeable entryway has the advantage of protecting drones and other contents of the hangar from the outside environment, from entry or tampering by unauthorized persons or devices, etc., when the entryway is closed.

An exemplary drone base may include a launching/landing area, a storage area, a power source repowering area, a service area (which may be a separate area or may be, for example, the launching/landing area or storage area), and various combinations thereof. For example, all of said areas may be present to most fully support drone operations.

The drone launching/landing area of a given drone base may be a designated area of the base platform or a floor or other structure within a drone base hangar. In other exemplary embodiments, the drone launching/landing area may be an elevated platform or an otherwise suspended structure. In some drone base embodiments, the drone launching and landing areas may be separate areas of the drone base (e.g., opposite ends of the drone base). The drone storage area may be similarly designated. With respect to drone storage, it should be noted that the drone storage area need not be physically divided into a plurality of drone storage spaces. Rather, the individual spaces into which the drone storage area is divided may be virtual, as designated by the size and number of the particular drones supported by a given base. The use of virtual storage spaces allows each drone storage space to be dynamically defined—meaning that some spaces may be larger than others, etc. In fact, adding a new drone to the inventory or removing an existing drone from the inventory may cause an automatic remapping of the drone storage area. The use of virtual storage spaces thus facilitates the storage of as many drones as possible within the storage space available. Storage space definition and allocation will be automatically performed by the drone base control system based on the known drone inventory and the physical characteristics of the drones comprising that inventory.

One or more areas of an exemplary drone base may also include a drone retention feature to releasably retain the drones residing within that area. For example, such a retention feature may be provided in the launching/landing area and/or storage area of a given drone base to help ensure that the location and orientation of a given drone does not unintentionally change. Various mechanisms may be utilized with such a drone retention feature. For example and without limitation, releasable passive or electromagnetic retention technologies may be used to releasably secure drones within a given drone base.

As with the aforesaid drone launching/landing area and drone storage area, the power source repowering area of a given drone base may also be a designated area of the base platform or a floor or other structure within a drone base hangar. The power source repowering area provides a location within the drone base where drone power sources may be repowered by recharging or refueling as mentioned above. In at least some embodiments, the power source repowering area is adapted to receive, store and recharge specialized drone power packs (described in more detail below).

When a drone base is provided with service functionality, the service functions may occur in a specialized area, or in another drone base area. For example, in some embodiments, drone service functions may be performed while a drone resides in the launching/landing area or the storage area.

Preferably, the overall base area collectively formed by the drone launching/landing and storage areas, and the power source repowering areas are serviced by a mechanical transfer device in the form of a crane, robotic arm, etc., with 3-axis or more mobility. For example, the transfer device may be a gantry crane that spans the storage and repowering areas along one axis and is able to move along the other two axes. Similarly, a robotic arm or other suitable device capable of reaching the bounds of the storage and repowering areas, or the bounds of the entire drone base, may also be used for this purpose.

The transfer device may have several purposes. For example, the transfer device may be used to lift and move drones between the launching/landing area, drone storage area, and power source repowering area. Thus, when a drone lands, it may be identified and moved to a designated storage space. A stored drone may be similarly moved to the launching/landing area for takeoff. As will be described in more detail below, the transfer device may also perform specific tasks associated with a power source repowering operation in at least some exemplary drone base embodiments.

Exemplary drone bases may be permanent or portable in nature. For example, a drone base may be physically mounted on the ground or a pad, on the roof of a building, etc. Contrarily, a drone base may be portable in the sense that it may be releasably mounted in/on a moving vehicle, may itself comprise a moving vehicle, etc., which facilitates the placement of a drone base on land, on water, or even in the air. The location of a given drone base and the permanency or portability of its mounting will likely be largely application driven.

Exemplary drone bases may operate with human assistance. Contrarily, exemplary drone bases may instead operate autonomously, which greatly expands the possible uses thereof. In any case, it should be understood that supporting the operation of a multitude of drones will, in any case, require various control and communications capabilities, including but not limited to those relating to logistics and flight control.

In this regard, a given drone base may include or otherwise be in communication with a central control operator that may, for example, dispatch and recall drones as desired. Likewise, a given drone base may also be in communication with its drones while said drones are airborne. This would allow the drone base to send landing and or other instructions to the airborne drones, and may also permit two-way communication by which problems, etc., may be reported to the base by the drones. In this manner, the flight control subsystem of a drone base may give landing, takeoff, and/or recharging priority to a particular drone(s) based on varying criteria such as but not limited to drone damage, low battery power, etc.

An exemplary drone base may also include a logistics subsystem that is aware of the locations of drones currently sited at the base. The logistics subsystem is thus able to maintain a drone inventory, manage drone storage, power source repowering, servicing and, in conjunction with the drone base flight control subsystem, oversee drone takeoffs and landings.

A given drone base may also be capable of communicating with one or more other drone bases. Such communication may be beneficial for several reasons. For example, if a drone associated with (e.g., homed at) one drone base needs to perform an emergency landing and another drone base is nearer to the current location of said drone, the drone bases may communicate to permit landing of the drone at the nearer drone base. In such a case, the home base might transmit information about the drone in question to the nearer base so that the nearer base begins relevant communications with the drone. The nearer base may also perform various logistic functions so as to accommodate the foreign drone.

Drone bases may also communicate for any number of other reasons such as but without limitation, to manage drone inventory, to manage base supplies, etc. In this regard, it might be desirable to transfer one or more drones to another base if the drone inventory at that base is low or more than a typical number of drones are needed at that location for some reason. Likewise, if a given drone base is low on supplies (fuel, batteries, spare parts, etc.) and one or more other nearby bases are well-stocked, the bases may communicate in a manner that permits drones from the poorly-supplied base to be repowered and/or serviced at one or more of the other bases. Thus, it is generally possible for multiple bases to communicate so as to provide a drone operations support network that covers a much larger drone operating area than that covered by any single drone base.

An exemplary drone base may also be equipped with one or more security systems that permit the drone base to implement various security measures to protect itself against detrimental conditions, whether naturally occurring, some form of attack, etc. For example, in a simplistic case, the drone base may simply recall its drones and close the roof or other portal if inclement weather conditions are detected. The roof or other portal may also be closed and secured if an attempted and authorized physical intrusion is detected. Similarly, countermeasures to various deliberate attacks such as those on the base power supply, communications network, physical structure, etc., may also be implemented. Such countermeasures may include any such countermeasures known in the art in regard to protecting power and communication networks, but may also include launching drones to assist with base self-security or requesting similar assistance from drones associated with other bases, contacting human operators, etc. In military and/or law enforcement applications, drone bases may of course be equipped with various weaponry or other types of specialized countermeasures that are not generally available for public use.

While the above disclosure has been directed to various general features of exemplary drone base embodiments, certain other exemplary embodiments described herein are directed to a specialized drone power source. While drone power sources may take the form of liquid, gaseous, or other fuels, the exemplary drone power source embodiments described and shown herein are directed to an electrical energy storage device (although said embodiments may be adapted to utilize other fuels). More particularly, the exemplary drone power source embodiments described and shown herein are directed to an electrical energy power pack that is modular in nature and designed to facilitate removal of the power pack from and installation of the power pack to a drone without the need for human assistance.

Various exemplary embodiments of these power packs are intended for use with a larger system, such as the aforementioned drone operating base, where drones have their power packs managed by an automatic system. This allows a drone to be repowered and put back in service with a minimum of down time. Exemplary power pack embodiments described and shown herein seek to provide a standardized approach to power source connections and footprints, something that is believed to be completely undeveloped in the drone industry at the present time.

In this regard, it is noted that known drones may have markedly different power source locations. For example, some drones have their power source located underneath the frame, some between the frame, some on top of the frame, and still other drones may have their power sources totally enclosed by a body of sorts. Exemplary power packs described and shown herein are designed for mounting atop a drone, which facilitates the physical reaching and grasping of a power pack by an automated power pack management system (which may be a part of an exemplary drone base embodiment). However, alternative exemplary drone power pack embodiments may instead be of bottom mount, front or rear mount, or side mount design.

Exemplary power pack embodiments described and shown herein may include a housing having a base section, a mid-section, and a lid section. In at least one exemplary embodiment, the base section, mid-section, and lid section exist as separate components that are assemblable to form the power pack housing. In other embodiments, the housing may be of a more unitary construction.

Each of the base section, mid-section, and lid section may have one or more subcomponents. For example, in certain exemplary embodiments, the base section includes a locking stud hole and a portion of a power connector block; the mid-section includes a locking mechanism housing and a corresponding portion of the power connector block; and the lid section includes locking mechanism wiring and gripper engagement features. The various subcomponents of each housing section will be discussed in more detail infra.

Exemplary base section embodiments may be of various shapes and sizes. In certain exemplary embodiments, however, the base section is of substantially rectangular shape (i.e., plate shaped). When such a rectangular base section is provided, it may have a tapered edge that increases in dimension in a top-to-bottom direction to facilitate assembly to the mid-section of the power pack housing. Typically, but not necessarily, the base section is the only power pack component that will be permanently attached to a drone, as the base section provides a standard power source interface.

Housing mid-section embodiments are designed with a size and shape that will properly mate with a corresponding base section and lid section. In at least certain exemplary embodiments, the mid-section of the power pack housing is two-sided, and may also be a one-piece component. In this embodiment, a top side of the mid-section is adapted to mate with the lid section and to receive and retain an electrical energy storage device, such as a battery or capacitor, while a bottom side is adapted to mate with the base section and to house a locking mechanism and the aforementioned portion of a power connector block.

The lid section of the power pack housing functions, most basically, to seal the top side of the mid-section—and the power source housed therein—against intrusion by the elements, etc. Attachment of the lid section to the mid-section may be accomplished in various ways, but preferably by a mechanism that permits detachment for access to the top side of the mid-section.

The lid section also serves as an engagement point for a mechanical device such as a crane or robotic arm equipped with an appropriate end effector. For example, the end effector may be a powered gripper. The lid section includes engagement features appropriate to the end effector being used, such that the end effector can securely grip the engagement features and separate the lid section and mid-section from the base section of the power pack housing if desired.

The lid section may also include one or more motor control connectors. As will be explained in more detail infra, the motor control connectors permit a controlling mechanism (e.g., the end effector of a crane or robotic arm) to supply electrical energy to a connected locking mechanism that is located within the power pack housing and secures the mid-section to the base section of the housing, for the purpose of operating the locking mechanism to lock/unlock the mid-section to/from the base section when needed, as mentioned above.

The top side of the lid section, the top side of the base section, etc., of a power pack housing, may also include one or more marks or other features that may be used for alignment purposes by one or more subsystems of a drone base. For example, the aforementioned crane or robotic arm may be equipped with a vision system or some other sensing device capable of locating an alignment mark or other alignment feature so as to properly orient and align an associated end effector with the lid section or base section of the power pack. In the former case, the end effector may become properly engaged with the engagement feature(s) of the lid section for the purpose of separating the lid section and mid-section from the base section of the power pack housing, or to move an associated drone from one location to another within a drone base. In the latter case, the alignment mark or other alignment feature may be used to align a lid section and mid-section of a power pack housing with a base section attached to a drone, such as during a power source repowering operation.

A drone or unit identification mark may also be located on a power pack housing lid section or base section—or elsewhere—for purposes of identifying and inventorying drones. Such a unit identification mark may be, for example, a bar code, a RFID tag, etc.

Other novel aspects and features of the general inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 4A is an enlarged top-side isometric view and FIG. 4B is an enlarged bottom-side isometric view of the housing base section shown in FIG. 3A;

FIG. 6A is an enlarged bottom-side isometric view and FIG. 6B is an enlarged bottom view of the housing mid-section shown in FIG. 3B;

DETAILED DESCRIPTION OF THE EXEMPLARY EMBODIMENTS

Drone Operating Base

Figure 1:
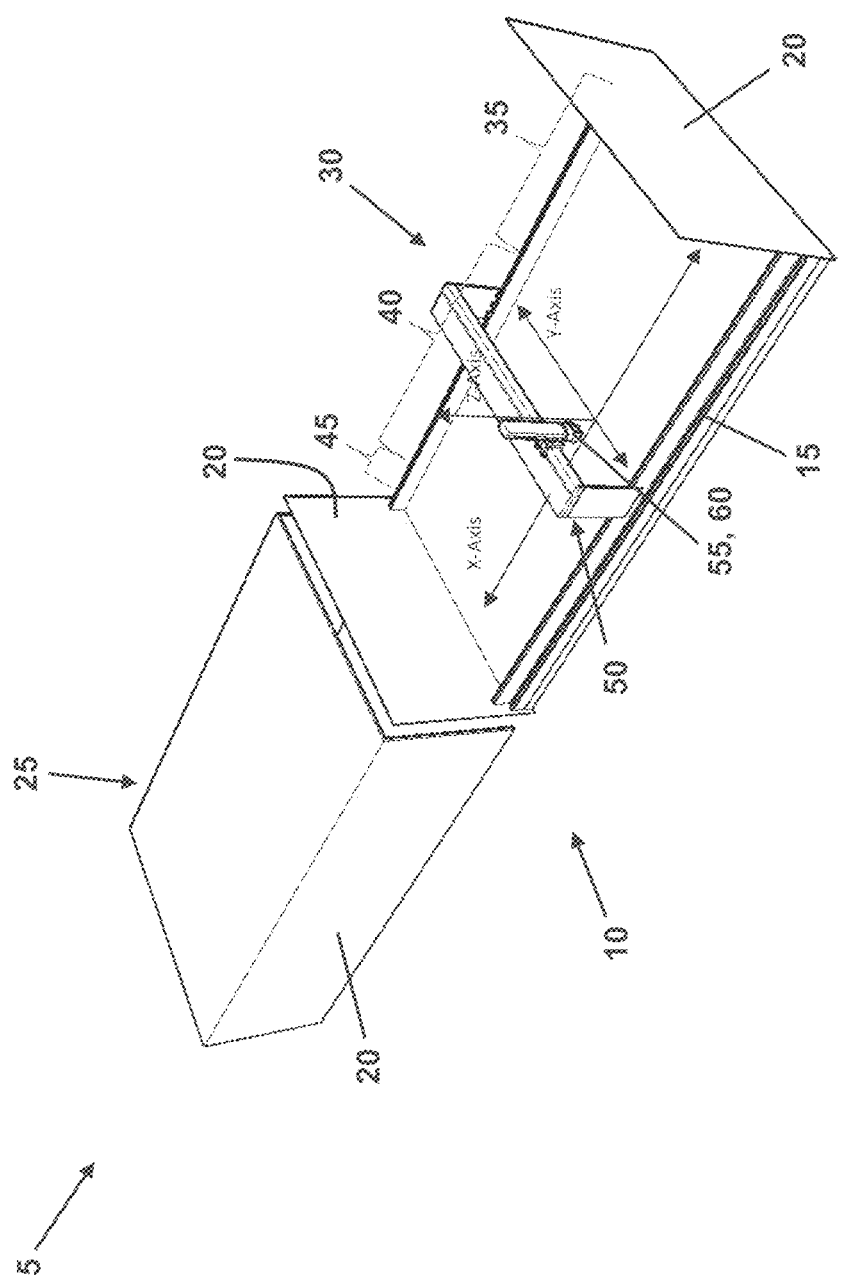
FIG. 1 is an isometric view of one exemplary drone base.

One exemplary embodiment of a drone operating base 5 (drone base) is depicted in FIG. 1. As explained above, such a drone base may serve as a location for supporting the repeated launching and landing of multiple drones, a location where said drones may be sheltered, a location where drones may be repowered, and/or a location where drones may be serviced. A single drone base may house and support multiple drones.

As can be observed in FIG. 1, this exemplary drone base includes a structure 10 for supporting drones during the aforementioned drone support operations. The structure 10 includes a framework 15, a plurality of panels or walls 20, and a sliding roof panel 25, that cooperatively form an enclosure, which may also be referred to generally herein as a hangar. While a drone base may be of various designs and sizes, the exemplary drone base 5 of FIG. 1 is substantially rectangular.

The framework 15 of a given enclosure may be comprised of multiple individual and interconnected frames. For example, as may be observed in FIG. 1, a lower frame and associated portion of the walls forms a lower or pan section of the enclosure, while a mid-frame provides support for a mechanical drone transfer device (see below) and for the sliding roof panel 25 (which also includes a frame). The framework of other embodiments may be different in configuration and/or dimension. For example, in other enclosure embodiments, the framework and walls may be higher such that the sides of the enclosure are formed thereby rather than by side walls of the sliding roof panel 25 as in the embodiment of FIG. 1. In such a case, the sliding roof panel 25 may be more in the form of a sliding lid or door. An exemplary framework may be comprised of permanently joined members (e.g., welded metal members), or may be modular in nature, such as for example, a framework constructed from T-slot aluminum extrusions and corresponding fasteners.

To provide shelter and protection for the drones associated with the drone base 5 while simultaneously permitting drone ingress and egress, the sliding roof panel 25 is designed to move along a roof track and is operable to reveal or close an enclosure entryway 30 through which drones may pass during launching and landing operations. As would be understood by one of skill in the art, the sliding movement of the roof panel 25 may be guided in nature. Likewise, various motive devices including but not limited to linear actuators, motors and associated drive means, etc., may be used to produce the sliding motion of the roof panel 25.

One of skill in the art would also understand that the sliding roof panel 25 of the exemplary drone base 5 may be replaced in alternative drone base embodiments by one or more other entryway closure devices such as doors, windows, hatches, etc. Furthermore, such other closure devices may be located other than along the roof of a given drone base and may be opened and closed in other than a linear (sliding) manner.

The roof panel 25 itself may be of varying designs depending on environmental conditions and possible optional usage. For example, a pitched roof may be required where snow loads are an issue. When a pitched roof is not required, a flat roof may be a possibility and may be desirable, as a flat roof could provide a temporary drone staging area where drones could land if, for example, the designated launching/landing area is too congested. The roof 25 may also support other structures or devices, such as but not limited to communications equipment and landing assist beacons.

The sliding roof panel 25 may be sealable or substantially sealable with other structure of the enclosure when closed so as to best protect the housed drones and other contents of the enclosure from the outside environment (e.g., rain, snow, insects, birds etc.), from entry or tampering by unauthorized persons or devices, or from other undesirable intrusions. Providing a sealable roof panel 25 would also facilitate optional climate control of the interior of the drone base housing.

An exemplary drone base may include, for example and without limitation, a launching/landing area, a storage area, a power source repowering area, a service area (which may be a separate area or may be, for example, the launching/landing area or storage area), and various combinations thereof. For example, all of said areas may be present to most fully support drone operations. Other areas not specified above may also be present.

As can be observed in FIG. 1, the interior of this exemplary drone base enclosure includes a drone launching/landing area 35, a drone storage area 40, and a power source repowering area 45. When these areas are present in other drone base embodiments, the arrangement and relative size of the areas may be different. Additionally, while each of the drone launching/landing area 35, drone storage area 40, and power source repowering area 45 are indicated as being separate areas in FIG. 1, it is possible to utilize combined areas in other embodiments. For example, depending on the size of the drone base and the number and size of the drones supported thereby, it may be possible to provide a combined launching/landing and storage area.

Generally speaking, the drone launching/landing area 35 of the exemplary drone base 5 provides a space and a surface that supports drone launching and landing operations. The launching/landing area surface may be, but is not required to reside in the same plane as the storage area surface, as represented in FIG. 1. In fact, other drone base embodiments may include launching/landing areas comprised of an elevated platform or an otherwise suspended launching/landing structure. Further, in other drone base embodiments, separate landing and launching areas may be provided rather than a combination landing/launching area. For example, drones may land at one end of a drone base and launch at an opposite end.

In one alternative embodiment (not shown), a drone launching/landing system is provided, from which drones may be suspended. More particularly, a carousel-type drone launching/landing system may be present, with the carousel housed in an elevated or non-elevated enclosure. The carousel-type launching/landing system may have a track that is extendible through an opening or door in the enclosure to engage landed drones. Alternatively, a landing drone could enter the enclosure through an opening or door. Drone hangers may be associated with the track and extend downward therefrom. The drone hangers are adapted to engage landed drones that pass beneath the hangers. Once engaged with a hanger, the engaged drone becomes idle and is suspended by the hanger. Suspended drones may then be transferred to another area of the drone base via the track, or possibly onto a side track, where the drone may be repowered via the hanger mechanism. In the same manner, a suspended drone may instead or in addition to, be transferred to a service/maintenance area. Drones that are ready to resume flight may be transferred back to the launching/landing area where they power up, undock from the hanger, and take off.

The launching/landing area 35 of the drone base 5 or another launching/landing area of an alternative drone base embodiment may also be equipped with specialized equipment, such as but not limited to IR beacons that allow a drone to land with more accuracy. A vison system 60 such as a multi-camera vision system may also be present and operable to determine the exact position of a landed drone and to communicate that position to the base for service or maintenance operations.

The drone storage area 40 may be a similarly designated portion of the interior space of the drone base enclosure. With respect to drone storage, it should be noted that the drone storage area 40 of the exemplary drone base 5 depicted in FIG. 1 could, but does not, include physical dividers (e.g., walls). Rather, the drone storage area 40 of this exemplary embodiment is divided into virtual drone storage spaces, as determined by an appropriate portion (e.g., logistics) of the drone base control system. For example, the drone storage area 40 may be divided into a number of virtual storage spaces based on the overall footprint of the storage area 40 and the size and number of the particular drones supported by the drone base 5 at a given time. In this regard, the storage area control system may utilize a drone center and forward direction when virtually allocating drone storage spaces.

In any case, the use of virtual storage spaces allows each drone storage space to be dynamically defined—meaning that some spaces may be larger than others, the number, sizes and arrangement of the storage spaces may change, etc. In fact, adding a new drone to the inventory or removing an existing drone from the inventory may cause an automatic remapping of the drone storage area. The use of virtual storage spaces thus facilitates the storage of as many drones as possible within the storage space available. Storage space definition and allocation may be automatically performed by the drone base control system based on the known drone inventory and the physical characteristics of the drones comprising that inventory.

At least the launching/landing area 35 of the exemplary drone base 5 may also employ special flooring that allows electrical energy to be transferred from the floor through the landing pads, landing skids, wheels, feet, etc., of a drone for purposes of charging while the drone rests on the flooring. The use of such flooring may allow an electrically-powered drone to be recharged through contact with the floor of the drone base, or to remain powered on even while its own electric power source is removed for recharging, replacement, etc. Allowing a drone to remain powered on during a repowering operation lessens the overall time required to repower and re-launch the drone, and may also allow the drone to maintain communications with the drone base during the repowering operation. This concept is discussed in more detail below in regard to drone power pack exemplary embodiments.

As with the aforesaid drone launching/landing area 35 and drone storage area 40, the power source repowering area 45 of the drone base 5 may also be a designated portion of the interior space of the drone base enclosure. As discussed above, the power source repowering area 45 provides a location within the drone base 5 where drone power sources may be repowered, such as by recharging or refueling. In some drone base embodiments, the repowering area may be specially adapted to receive and recharge novel drone electrical power packs (described in more detail below).

Any one of the drone launching/landing area 35, drone storage area 40, or power source repowering area 45 of the drone base 5, or all or a combination of less than all of said areas, may be provided with a drone retention feature. Generally speaking, a drone retention feature is adapted to secure drones to the floor of the drone base 5 or to another surface on which the drones are supported—such as may be necessary or desirable when, for example, a mobile drone base travels over rough terrain or choppy water. Various mechanical locking mechanisms (e.g., clamps), specialized flooring, or combinations thereof may be used for this purpose.

In one exemplary embodiment, the drone retention feature is provided in the form of a magnetic retention mechanism that releasably secures the drones to the underlying support (e.g., floor) surface. In this exemplary embodiment, the flooring upon which the drones are supported may be made to be either or both (in different sections) passively or electrically magnetic. In the former case, for example, the flooring may be of magnetic composition, coated with a magnetic layer, or statically charged. In the latter case, the flooring may be constructed to function as an electromagnet that can be selectively energized and de-energized. In either case, the associated drones may be provided with ferrous metal on the floor-contacting portions of their landing gear or may otherwise be provided with some floor-contacting structure adapted for magnetic attraction with the drone retentive flooring.

When drone retention is accomplished through the use of an electromagnetic floor, drone retention and release may be performed simply by changing the electromagnetic state of the flooring. That is, when the electromagnetic floor is energized, a properly modified drone supported thereon will be magnetically attracted to the floor and retained in position and orientation. When the electromagnetic floor is de-energized, retention of the drone is released and the drone may be freely moved about the base (such as by a mechanical transfer device as described below) or may be launched.

When, on the other hand, drone retention is accomplished through the use of a statically charged or permanent magnet floor, drone retention and release may be performed by modifying the associated drones to selectively break the magnetic attraction with the floor. For example, the floor-contacting portions of the drone landing gear or some other drone structure adapted for magnetic attraction with the drone base floor, may be provided with small electromagnetic coils that can be selectively energized/de-energized with proper polarity to produce or release attraction with the magnetic floor of the drone base. Energization/de-energization of such electromagnetic coils may be performed by an associated drone itself, or by a drone transfer mechanism in electrical communication with corresponding drone circuitry (see, e.g., below). Thus, when the electromagnetic coils of a drone are de-energized, the drone will be magnetically attracted to the floor and retained in position and orientation. When the electromagnetic coils of a drone are energized, a repelling magnetic force is produced that releases retention of the drone, and the drone may be freely moved about the base (such as by a mechanical transfer device as described below) or may be launched.

The overall area collectively formed by the drone launching/landing area 35, drone storage area 40, and power source repowering area 45 is serviced in this embodiment of the drone base 5 by a mechanical (e.g., robotic) transfer device. In other embodiments, such a mechanical transfer device may only service a portion of a drone base.

In this exemplary embodiment of the drone base 5, the mechanical transfer device 50 is provided in the form of a gantry crane 50. The mechanical transfer device could obviously be another type of device in other drone base embodiments. The exemplary gantry crane 50 is preferably provided with at least 3-axis motion as indicated in FIG. 1, so as to best reach all necessary areas of each area serviced thereby, as well as to engage and move drones of different heights, etc. The gantry crane 50 is also provided with an end effector in the form of a gripper 55 or some other implement suitable to engage and retain the various drones sited at the drone base. A given end effector may be swapped with another end effector such as through the use of well-known quick-change systems, etc., when necessary to perform other tasks. For example, a given end effector can be traded for another end effector in the form of a specialized tool adapted to swap out drone props or perform some other drone maintenance or repair function.

The gantry crane 50 has several functions in this exemplary embodiment of the drone base 5. With respect to drone launching operations, for example, the gantry crane 50 is useable to move drones between the drone storage area 40 and/or power source repowering area 45, and the drone landing/launching area 35. With respect to drone storage operations, the gantry crane 50 is also useable to place drones in the storage area virtual storage spaces and to rearrange drones already in the drone storage area when needed. The gantry crane 50 may also move drone power sources between the drone landing/launching area 35 or drone storage area 40 and the power source repowering area 45. The gantry crane 50 may also perform other specific tasks when used in a power source repowering operation employing the novel drone power pack described in detail below.

The exemplary drone base 5 may include various subsystems that assist with drone support operations. For example, this exemplary drone base 5 embodiment includes at least two subsystems that support the various functions of the gantry crane 50. First, a vision subsystem is provided and adapted to look for an identifying alignment marks on objects within the interior space of the enclosure and within the operating area of the gantry crane. An identifying alignment mark may be a symbol, but is not limited thereto. The vision system may employ a number of different types of cameras, sensors or other detector devices, as well as different imaging techniques. A vision system 60 may be mounted on the gantry crane 50 as is shown with the exemplary drone base 5 of FIG. 1, but could also be a separate system in appropriate communication with the gantry crane 50. The use of identifying alignment marks is discussed in further detail below in conjunction with exemplary drone power pack embodiments.

In this exemplary drone base 5 embodiment, a spatial alignment subsystem is also provided to work in conjunction with the vision subsystem 60 and the gantry crane 50. The spatial alignment subsystem performs several functions. One function of the spatial alignment subsystem is to calculate the rotation that the gripper 55 or other end effector of the gantry crane 50 must make in order to perform a pickup operation. This is accomplished by locating key features on an identifying alignment mark. For example, if the identifying alignment mark is the symbol d$\hat{\diamond}$, the right edge of the letter "d" could be used to create a line and then the "^" of the $\diamond$ character could be used to determine the direction. An exact angle could then be calculated to determine the forward direction of the identifying alignment mark With such calculations completed, the spatial alignment subsystem may then calculate an XY transform to move the gripper 55 of the gantry crane 50 over the identifying alignment mark, i.e., the d$\hat{\diamond}$ symbol in this example. Again, the tip of the ^ portion of the symbol may be used in this calculation, as may another recognized feature of the identifying alignment mark.

Once the crane 50 moves and aligns itself with the identifying alignment mark, the crane can lower the gripper 55 to a proper position to grip a given feature of the object being picked up. The gripper may then be closed to engage the object. A determination of the proper distance by which the gripper 55 must be lowered may be determined if the identifying alignment mark is a known size and the camera of the vision system 60 has been previously calibrated with a reference symbol. A comparison of the imaged size of the identifying alignment mark to the calibrated size would allow for a distance calculation to be performed and, thus, a proper lowering distance to be determined. Such distance determination may be accomplished by other techniques in other embodiments. For example, proximity and/or other sensors may be employed to inform the gantry crane 50 when the gripper 55 is properly positioned with respect to an object to be engaged.

While the exemplary drone base 5 has been described and shown herein as employing a gantry crane, drone base embodiments are not limited to the use of a gantry crane. For example, other drone base embodiments may employ a mechanical transfer device in the form of a multi-axis robotic arm or another device capable of performing the functions described with respect to the exemplary gantry crane 50. Such alternative transfer devices would be familiar to one of skill in the art and are considered to be within the scope of this disclosure. Likewise, both a vision subsystem with associated identifying alignment marks, and a spatial alignment subsystem are, of course, also usable in drone base embodiments that utilize mechanical transfer devices other than the exemplary gantry crane 50 described above and shown in FIG. 1.

It is recognized that in certain situations, it may be necessary or desirable to completely remove drones from a drone base. For example, if a given drone develops a fuel or battery leak, or becomes non-functional and cannot be repaired through the service functionality provided by the drone base, it may be desirable to remove the non-functioning drone from the drone base to make room for a functioning replacement drone. In such a case, or for other reasons, an exemplary drone base may also include a drone removal mechanism that is adapted to completely remove drones from the drone base. The drone removal mechanism may simply be the mechanical transfer device (e.g., gantry crane 50) that is also used to otherwise move drones as described above, in conjunction with an activatable portal through which drones may be removed from the drone base. Such an activatable portal may be a dedicated portal or may be the entryway through which drones leave and enter an enclosed drone base when launching and landing. Alternatively, the drone removal mechanism may be a separate device that is adapted for the task of drone removal. Drones may be removed to a separate enclosure or may simply be deposited on the ground, etc., outside of the confines of the drone base. When a drone is removed from a drone base, a signal may be sent to a command center or otherwise for purposes of notification and/or for triggering eventual retrieval of the removed drone. Removal of a drone may also trigger a signal (e.g., a request) that results in replacement of the removed drone.

The drone base 5 may be permanent or portable in nature. For example, the drone base 5 may be physically mounted on the ground, a pad, the roof of a building, a specialized drone base mounting structure, or in some other location where it is not intended that the drone base will be moved after mounting—at least not regularly. Contrarily, the drone base may be portable in the sense that it may be mounted in/on a movable vehicle such as a truck, a railroad car, a boat or ship, etc. It may also be possible for the drone base 5 to itself comprise a moving vehicle by providing the drone base with a motive source and wheels, tracks, etc. The potential portability of the drone base 5 facilitates the placement of a drone base on land, on water, or even in the air. The permanency or portability of the drone base 5 may be application specific and may also depend on the required size of the drone base, etc.

The drone base 5 preferably includes a command (control) system, which may include a computer(s) and associated logic/software, communication equipment, sensors, and any other devices necessary to permit monitoring and control over drone base functions, communication with the drones associated with the drone base, and possibly communications with remote sites and/or other drone bases. An exemplary drone base may also include built-in GPS capabilities that allow the drone base to autonomously determine its geographic location and to provide said geographic location to relevant drones.

A computer (control) system may provide required resources and I/O to any and all locations and destinations where data and control signals may flow. The computer system is not necessarily a single resource, but may be a multitude of varying resources working together using industry standards and possibly proprietary protocols. For example, the computer system may communicate with hardware for controlling motors for the crane 50 and gripper 55, turn on and control the aforementioned electrical energy transferring and/or drone retention flooring when present, control charging systems, communicate with and/or control drone base subsystems such as the aforementioned vision subsystem and/or spatial alignment subsystem, communicate with drones and operators, etc. The computer system of the drone base 5 may be added to and customized as needed, taking into consideration varying factors such as environment, application, location, etc. In short, a given drone base may utilize as many operating systems as are needed.

The exemplary drone base 5 is not limited to use of any particular hardware or software. Nor is the drone base 5 limited to any particular communications devices, techniques or protocols. With respect to the latter, communication may be performed using one or a combination of several protocols including, but not limited to, Wi-Fi, Bluetooth®, long range radio, cell networks, satellite networks, etc. The drone base 5 may select and utilize as needed the proper protocol for the communication and situation at hand. Communications are also not limited to one protocol at a time but, rather, it is possible for multiple communication protocols to be in play simultaneously.

A drone base control system may include a logistics subsystem for managing the storage, launching/landing times, etc., of all the drones sited at the drone base 5, as well as the repowering of drone power sources. The drone base control system may also include a flight control subsystem, which may function at least in part to communicate with airborne drones and/or drones that are about to launch. For example and without limitation, a given flight control subsystem may be operative to dispatch and recall drones as desired. To this end, the drone base 5 may send GPS coordinates and/or landing and or other instructions to the airborne drones, and may also permit two-way communication by which problems, etc., may be reported to the drone base by the drones. In this manner, the flight control subsystem of the drone base 5 may give landing, launching, and/or repowering priority to a particular drone(s) based on varying criteria such as but not limited to drone damage, low battery power, low fuel, etc. The flight control subsystem may also communicate with and operate in conjunction with the logistics subsystem to provide overall management of the operation, storage and repowering associated with the drones sited at the drone base 5 and their corresponding power sources. Either or both of the logistics subsystem and flight control subsystem may communicate with various other aspects of the exemplary drone base 5, such as but not limited to, other computerized subsystems, and mechanical devices/systems such as but not limited to, the gantry crane 50.

It is possible for the drone base 5 to operate with human assistance—i.e., under the partial or total control of one or more human operators. Alternatively, the drone base 5 may be in communication with a central control operator, which may be a remote command site or even another (master) drone base. However, in order to greatly expand the possible uses and locations of the drone base 5, the drone base may instead operate autonomously, such as through an appropriately designed and programmed control and communications system. In this manner, the drone base 5 need only be provided with a source of electrical power to be operable in remote, inclement, and/or possibly hazardous or dangerous locations. Electrical power for the drone base 5 may come from the grid, or may be generated onsite such as by a generator or solar panels or the like.

As alluded to above, the drone base 5 may also be capable of communicating with one or more other drone bases. For example, a home drone base 5 may communicate with another drone base to effectuate the emergency landing thereat of a drone(s) normally sited at the home drone base 5. In such a case, the home drone base 5 may transmit to the other, accepting drone base, any information about the drone(s) in question necessary to permit communications with the drone(s) and to facilitate its landing. The accepting drone base may also perform various logistic functions so as to accommodate the foreign drone. The drone base 5 may also communicate with other drone bases for any number of other reasons such as but without limitation, to manage drone inventory, to manage base supplies, etc.

The drone base 5 may communicate and cooperate with one or more other drone bases to produce a drone operations support network that covers a much larger drone operating area than that covered by any single drone base. In such a scenario, each drone base may operate autonomously, one drone base may act as a master drone base for the network of drone bases, or overall control commands may come from a remote command center. A given drone base may also act simply as a repeater for a given foreign drone, which may thereby impart the drone with an extended range by not only repowering the drone power source but also by communicating with the drone's home base on behalf of the drone.

When a plurality of drone bases act together to form a drone base network, the drone bases may communicate via any of the communication protocols identified above. The network may also employ a methodology of determinant and non-interfering simultaneous communication between drone bases. Further, the area of coverage of a given drone may be further extended by handing off base-to-drone communications and/or control from one drone base to another as the drone moves farther away from its home base—e.g., in a manner similar to that of transferring aircraft monitoring responsibility from one air traffic control center to another. Consequently, it should be understood that networked drone bases may communicate with each other and with a fleet of drones to facilitate substantially continuous or continuous (e.g., 24/7) drone operations over a vast area.

In addition to protecting the housed drones and other drone base contents from the negative effects of weather, animals, etc., the drone base 5 may also be equipped with one or more security systems that permit the drone base to implement various security measures to protect itself against non-environmental threats, such as some form of physical, electronic or communications attack. In addition to closing the sliding roof panel 25, the drone base may implement any countermeasures whether now known or later developed, to thwart an attack on its power supply, communications network, physical structure, etc. The launching of drones or the use of already airborne drones to assist with base self-security may be a part of any such countermeasures.

The drone base 5 may be provided with a variety of other features or systems. For example, and without limitation, the drone base 5 may include an emergency power system, such as an un-interruptible power source (UPS), that guarantees no power interruptions during drone base operations. Preferably, any such emergency power system is sized so as to permit a drone base to recall its drones and then power down if power is not restored. The drone base 5 may also include an alternate power system. For example, if the drone base 5 normally operates on electrical energy from the grid, the drone base may be further equipped with an alternate power source such as a wind turbine, solar panels, a generator, etc.

As mentioned above, the drone base 5 may also be adapted to service drones, such as by changing props, rotors, motors, electronics, payloads, etc. The drone base 5 may be further equipped with its own weather station for monitoring and autonomously reacting to weather conditions. The drone base 5 may be further adapted to stream data from its drones to remote locations using one or more various communications protocols. The drone base 5 may be further adapted to update drone onboard software as needed with new algorithms using various communications protocols. The drone base 5 may be further adapted to update drone onboard mission parameters as needed with new algorithms using various communications protocols.

In addition to the various possible exemplary drone base features and functionality described above, it is important to realize that exemplary drone bases according to the inventive concept are scalable in size to accommodate different numbers of drones and drones of different sizes. Likewise, it is possible to construct a drone base in a modular manner such that a plurality of individual drone bases, or drone base modules, may be interconnected to form a larger drone base as space requirements increase.

Drone Power Supply

Broadly speaking, a drone power supply (power pack) according to the general inventive concept is a specialized drone power source (e.g., battery, fuel, fuel cell, etc.) having a standardized enclosure and other features. The standardized enclosure facilitates attachment to and removal from a drone—including by non-human means—and also provides commonality among a fleet of drones. Exemplary power pack embodiments are comprised generally of upper and lower locking mechanism layers, a connections layer, a power layer and a manipulation layer. As described in more detail below, the use of such a drone power pack enhances the ability of an exemplary drone base as described above to autonomously repower and service drones.

One exemplary and non-limiting embodiment of a specialized drone power source in the form of a drone electric power pack 100 is depicted in FIGS. 2-8B. The particular design and format of the exemplary power pack 100 is provided for purposes of illustration only, and one of skill in the art will understand that a number of modifications to the exemplary design are possible while still allowing for a standardized power pack that may be interchanged between a multitude of drones.

The drone electric power pack (also referred to hereinafter as simply a power pack for brevity) 100 depicted in FIG. 2 utilizes an electrical energy storage device (e.g., a battery or capacitor) as its power source, although other power source types (e.g., liquid fuel) may be used in other embodiments.

The power pack 100 is lightweight and modular in nature, and provides a common power source form factor such that elements of one power pack may be interchanged with elements of another power pack. The design of the power pack also facilitates its disassembly and re-assembly, as well as removal of the power pack from and installation of the power pack to a drone. In conjunction with certain features of the above-described drone base 5, such disassembly/re-assembly and installation/removal of a drone power pack may be accomplished without the need for human assistance. For example, the power source repowering area 45 of the drone base 5 may include sockets or similar power pack engagement features into which power packs can be inserted by the gantry crane 50 for recharging, and subsequently removed and installed by the gantry crane on drones. The repowering sockets in the power source repowering area 45 may be the same as or similar to a base section (see below) of the power pack 100 and, therefore, provided with a locking mechanism (see below) capable of holding a power pack securely in place during recharging. All transfers, installations and removals of the power packs may be automatically performed by the gantry crane 50 of the drone base 5. Due to the adaptability of the gantry crane 50 or an alternatively employed transfer mechanism, the power source repowering area 45 of the exemplary drone base 5 may be modified as necessary to accommodate different or changed power source technologies without losing any of the autonomous functionality thereof.

Figure 2:
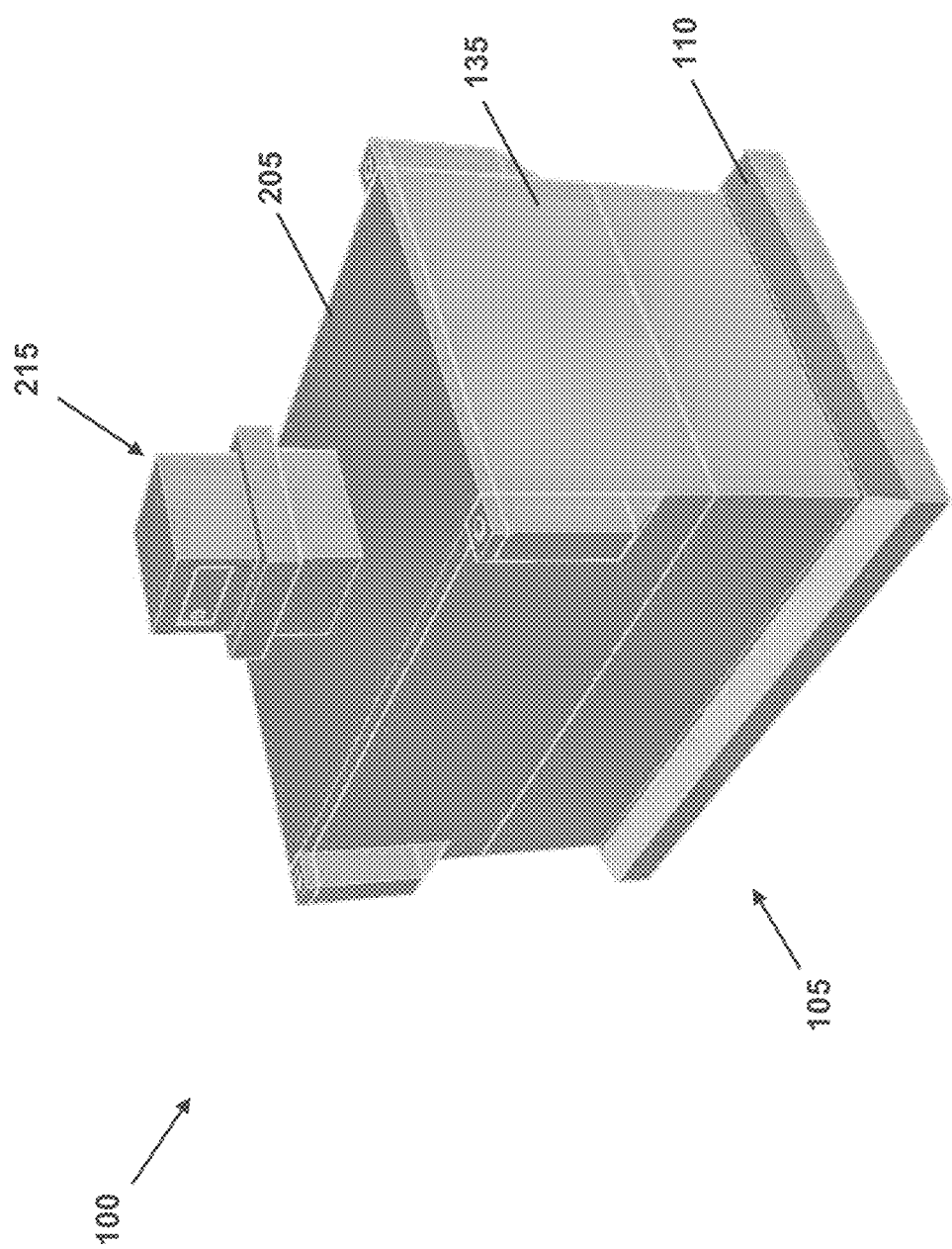
FIG. 2 is an isometric view of one exemplary drone power pack in an assembled state.

As can be observed at least in FIG. 2, the power pack 100 includes a housing 105 that contains the subcomponents of the power pack. In this exemplary embodiment, the housing 105 includes a separate base section 110 (e.g., lower locking mechanism layer), mid-section 135 (e.g., upper locking mechanism layer, connections layer and power layer), and lid section 205 (e.g., manipulation layer), that may be assembled to form the housing. Each of the base section, mid-section, and lid section of the housing 105 may have one or more subcomponents.

Referring now specifically to the exemplary base section 110, it can be observed that this exemplary base section is of substantially rectangular shape (i.e., plate shaped), although other base shapes may be employed. The base section (and the other housing sections) may be comprised of plastic, carbon fiber, or some other light but strong material, although the use of metals and other materials is certainly also possible. The base section 110 will generally, but not necessarily, be the only housing component permanently attached to a drone, as the base section provides a standard power source interface.

Figure 3C:
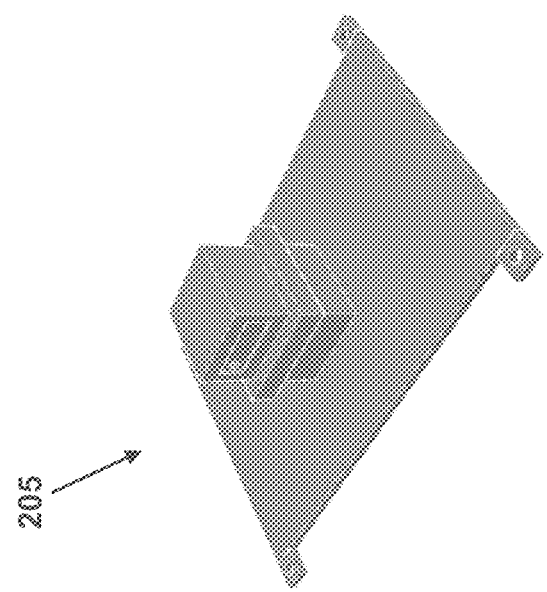
FIGS. 3A-3C are isometric views of a base section, mid-section and lid section, respectively, of a housing portion of the exemplary drone power pack depicted in FIG. 2.
Figure 3B:
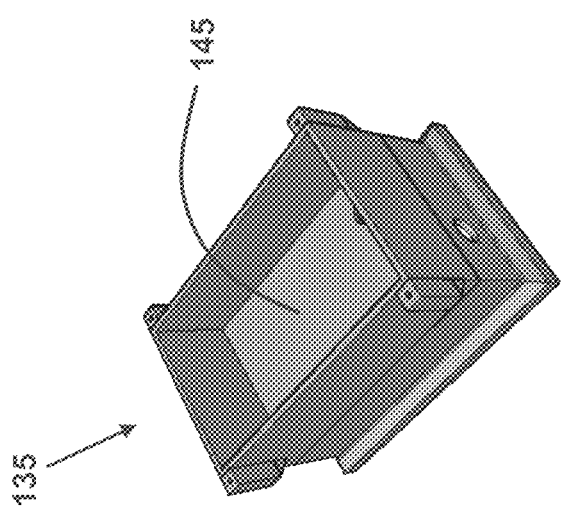
Figure 3A:
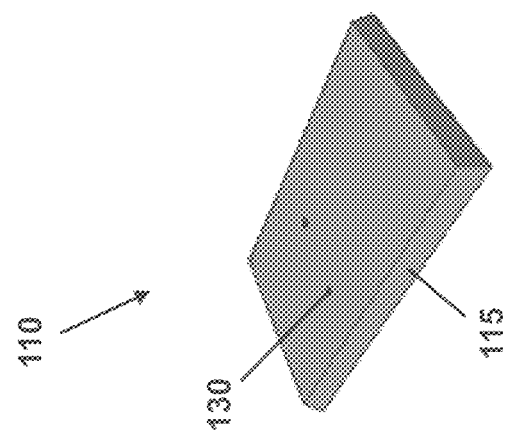
Figure 5:
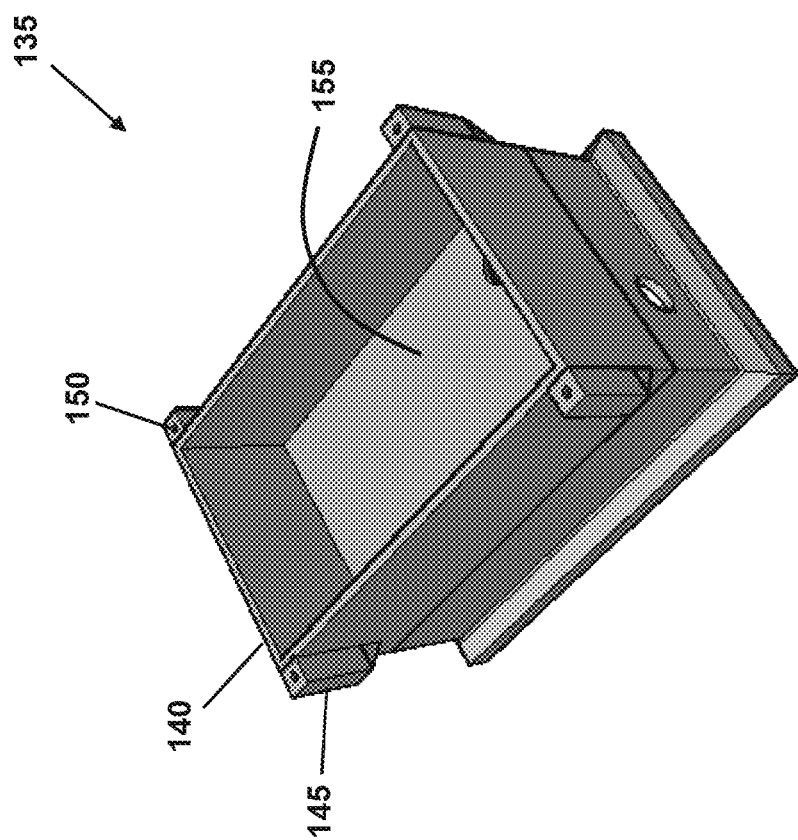
FIG. 5 is an enlarged top-side isometric view of the housing mid-section shown in FIG. 3B.

As can be best observed in FIGS. 3A and 4A-4B, the exemplary base section 110 may also include a tapered edge 115 that increases in dimension in a top-to-bottom direction to facilitate assembly to the mid-section 135 of the power pack housing 105. In the drawing figures, the base section 110 is shown to have a consistent thickness. However, this is not a necessary design feature. In fact, only sufficient material to form the stud hole and tapered edges of the base section 110 is truly required. Therefore, the base section of other housing embodiments may be thinner in non-essential areas. If the base section is to remain of substantially slab shape, as shown, standard weight reduction methods such as honeycombing, etc., may be employed to reduce material and weight if desired.

The exemplary base section 110 can also be observed to include a stud hole 120 through which a locking mechanism stud will protrude. This locking stud is part of a locking mechanism described in more detail below. Generally speaking, however, the locking stud is inserted from the top down through the stud hole 120 in the base section 110, where a machine nut underneath the base section is used to attach the locking stud thereto. In this exemplary embodiment of the base section 110, a stud hole nut retention feature 120a in the bottom face of the base section is hexagonally-shaped and countersunk for several reasons. One reason for this design is to permit the machine nut to be at least flush with the bottom of the base section 110, as a flush bottom surface will minimize interference when mounting the base section to a drone. The described design of the stud hole nut retention feature 120a also acts to hold the nut when tightening the stud from the top of the base section 110, and further keeps the nut from subsequently loosening.

This exemplary base section 110 is also shown to include a portion 125 of a power connector block—which may be a zero-force power connector block. The purpose of the power connector block 125 is to create power source connections between the power pack 100 and a drone to which the power pack is attached. The power connector block 125 may be integral to the base section 110 or may be a separately attachable subcomponent. The exemplary base section 110 also includes a hole 130 (see FIG. 3A) by which a power connector from a given drone to which the power pack 100 is attached can pass through the base section and connect to the power connector block 125. This connection may be the primary, but not necessarily the only connection, that will connect the power pack 100 to a drone. The power connector block 125 is discussed in more detail below.

Although not shown in the current drawing figures, the exemplary base section 110 further includes a number of drone attachment holes by which the base section may be securely mounted to a drone. The attachment holes are not shown only because the location of the holes may vary considerably based on the given drone to which the base section 110 will be mounted. Thus, it is highly possible that such drone attachment holes will be added to the base section 110 by an installer at the time of mounting the base section to a drone. It is also possible, however, that once drone manufacturers adopt the exemplary power pack design, the attachment holes may be predrilled or preformed during the base section manufacturing process.

Referring now to FIG. 3B, FIG. 5 and FIGS. 6A-6B, it can be seen that the exemplary mid-section 135 of the power pack housing 105 is designed to mate with the corresponding base section 110 and lid section 205 of the exemplary housing. The exemplary mid-section 135 of the power pack housing 105 is also shown to be a two-sided, one-piece, component having a top portion 140 and a bottom portion 160 in this embodiment. A top portion 140 of the mid-section 110 is adapted to mate with the lid section 205 by way of bosses 145 and screw receiving holes 150. Other mating means and attachment means may be employed in other exemplary embodiments.

The top portion 140 of the mid-section 135 also includes a compartment 155 to receive and retain an electrical energy storage device, such as a battery or capacitor. Because electrical energy storage devices such as batteries may come in many different shapes and sizes, securing the electrical energy storage device within the compartment may be accomplished in a variety of ways including, but not limited to, a hook and loop type fastener system, the use of a strap that passes over the actual electrical energy storage device, or even a custom designed and integrated fastener that meets the standards of a particular electrical energy storage device manufacturer. Other power source securing techniques familiar to one of skill in the art may certainly also be employed.

Since electrical energy storage devices can be of varying shapes and sizes, the exemplary housing mid-section 135 is designed to accommodate such variances. Particularly, the two-sided design of the exemplary housing mid-section 135 allows the bottom portion 160 to remain unchanged while the top portion 140 may be altered to accommodate electrical energy storage devices with dissimilar physical characteristics. Additionally, the two-sided design of this exemplary housing mid-section 135 further allows for the construction of a power pack 100 that is commensurate with the power requirements of a particular mission. For example, the dimensions of the top portion 140 of a given housing mid-section 135 may be designed to house a battery that can power a given drone for a particular operating time (e.g., 10 minutes or 20 minutes), while the lower portion 160 of the housing mid-section remains unchanged so as to properly mate with a base section 110 attached to a drone. As a smaller battery is required to power a drone for a shorter period of operation, the top portion 140 of a corresponding power pack may be made smaller than that of a power pack designed to power a drone for a longer time period. Such a reduction in the dimensions of the top portion 140 of the exemplary housing mid-section 135 reduces the weight of the housing mid-section, which may resultantly allow a drone to which the reduced size power pack 100 is installed to carry a heavier payload (e.g., cameras, sensors, etc.).

In an alternative embodiment, a given electrical energy storage device may be manufactured with an external size and shape that mimics the size and shape of the compartment 155 in the top portion 140 of the housing mid-section 135, or vice-versa, such that an electrical energy storage device may be securely retained in the compartment without the need for additional securing mechanisms. In another alternative embodiment, the external housing of a given electrical energy storage device may be designed and manufactured to replicate the top portion of a given power pack housing. In this manner, the external housing of the electrical energy storage device itself may act as a substitute for the top portion of a given power pack housing, which simplifies the power pack housing design by eliminating the need for the top portion thereof. That is, in such an embodiment, the external housing of the electrical energy storage device actually forms a portion of the overall power pack housing.

Depending on the power demand placed on the electrical energy storage device, some heat may accumulate in the electrical energy storage device compartment 155. Consequently, the top portion 140 and/or lid section 205 of the housing mid-section 135 may be designed to permit airflow therethrough to cool the electrical energy storage device. This also is a power source manufacturer consideration and therefore the design is not just a general approach to heat build-up but can also accommodate the specific requirements of a particular manufacturer. Active cooling of the electrical energy storage device compartment may instead or also be provided in some exemplary drone power pack embodiments.

A bottom portion 160 of the exemplary housing mid-section 135 is adapted to mate with the exemplary base section 110. The bottom portion of this exemplary housing mid-section 135 includes at least a locking mechanism housing 165 and a mating portion 200 to the power connector block portion 125 included on the base section 110.

With respect to mating with the housing base section 110, it is noted that the bottom side of this exemplary housing mid-section 135 includes a tapered edge 170 that complements the tapered edge 115 of the exemplary base section 110. That is, the aggregation of the angles of the tapered edges 115, 170 of the base section 110 and mid-section 135 preferably equal 90 degrees. The angles of the tapered edges 115, 170 may be selected such that when the base section 110 and mid-section 135 components are assembled, the tapered edges thereof provide both lateral and rotational alignment and stability between the components. Such alignment of the housing components may be valuable with respect to producing proper alignment and location of the subcomponents associated therewith. Furthermore, the tapered edges 115, 170 ensure that the base section 110 and mid-section 135 remain in proper alignment after assembly and during operation of a drone to which a power pack 100 including said base section and mid-section is attached.

The disclosed interface between the exemplary base section 110 and the exemplary mid-section 135 of the housing 105 also results in the base section fitting partially within the mid-section, such that the mid-section partially overlaps the base section. This fitment of the housing mid-section 135 to the base section 110 results in a desirable lowering of the center of gravity of the power pack 100, and also produces a more weather-proof seal between the base section 110 and the mid-section 135.

Another benefit of the tapered edge design of the exemplary base section 110 and mid-section 135 is a resulting zero-force engagement and disengagement of the base section and mid-section housing components. This allows a power pack 100 to be removed from a drone without causing any drone movement, and also prevents a power pack from failing to separate from the drone and resultantly causing the drone to be inadvertently picked up and carried along with the power pack during a power pack removal operation. Such zero-force engagement may be particularly advantageous, for example, when drone power packs are changed by automated means in a drone base without a drone retention feature.

The bottom portion 160 of the exemplary housing mid-section 135 also houses a locking mechanism (not shown), in association with the aforementioned locking mechanism housing 165 that is formed or installed in the bottom portion of the mid-section. One purpose of the locking mechanism is to releasably secure the mid-section 135 to the base section 110 of the power pack housing 105. Additionally, the locking mechanism may be used to similarly secure a base section to a socket or other aforementioned element of a drone base power source repowering area.

One exemplary embodiment of a locking mechanism is modeled essentially after a furniture cam lock screw and stud assembly commonly employed in the assembly of ready-to-assemble furniture. In this exemplary embodiment, the stud portion of the assembly is affixed (possibly permanently) to and extends upward from the housing base section 110 while the housing mid-section 135 retains the cam screw portion of the assembly. Consequently, when the base section 110 and the mid-section 135 of the housing 105 are assembled, the cam screw may be turned to engage the stud and to draw the stud and cam screw, as well as the base section and mid-section to which they are respectively attached, tightly together as would be understood by one of skill in the art.

In the design of the locking mechanism, the cam screw may either be provided with a motor coupling interface affixed thereto, or the cam screw design may be modified to integrally present such an interface. Such an interface is useful when, for example, the power pack 100 is used with a drone base, such as the exemplary drone base 5, so that the cam screw can be rotated by a motor rather than manually. In automated systems such as those that may be employed in an exemplary drone base, various motors may be used to rotate the cam screw. In one exemplary embodiment, a radio control type servo is used and has shown through experimentation to provide adequate torque and control over rotation of the cam screw. The cam lock screw and stud assembly locking mechanism design further promotes the aforementioned and desirable zero-force engagement and disengagement between a drone and a power pack. Other locking mechanisms may nonetheless be utilized in other power pack embodiments, as would be understood by one of skill in the art.

Referring now particularly to FIGS. 6A-6B, the installation, retention and functionality of the aforementioned exemplary locking mechanism may be better understood. As previously disclosed, the bottom portion 160 of the housing mid-section 135 includes a locking mechanism housing 165. Preferably, but not necessarily, the locking mechanism housing 165 is integral to the housing mid-section 135 to provide sufficient strength and durability to perform its function.

The locking mechanism housing 165 includes a cam screw hole 175 having a central axis that is oriented substantially parallel to the base section-engaging face 160a of the housing mid-section lower portion 160. In this exemplary embodiment, the cam screw hole 175 passes completely through the locking mechanism housing 165, and a manual unlock access port 180 is provided through a wall of the bottom portion 160 of the housing mid-section 135 so as to be substantially aligned with the cam screw hole 175. The cam screw hole 175 may be provided as a stepped bore having a smaller diameter along the side of the locking mechanism housing 165 facing the unlock access port 180 and a larger diameter on the opposite side. For example, the diameter of the bore facing the unlock access port 180 may be just large enough to permit a screw driver to be inserted therethrough to engage and manually unlock a cam screw that is installed in the cam screw hole 175. Preferably, the larger bore goes just deep enough to align the locking fingers of an associated cam screw with an inserted stud, thereby serving to prevent the cam screw from falling out of the access port side of the cam screw hole 175. Consequently, in this exemplary embodiment, a cam screw must be inserted into the cam screw hole 175 with its screw head side facing the manual unlock access port 180.

The locking mechanism housing 165 also includes a stud hole 185. The stud hole 185 is oriented substantially perpendicular to the can screw hole 175. The stud hole 185 may be tapered to minimize wear resulting from multiple power pack changing operations and the locking mechanism locking and unlocking functions associated therewith. The stud hole 185 may have a double taper, i.e., there may be a second taper on the opposite end of the hole to facilitate drone separation. With a cam screw installed in the cam screw hole 175 in the locking mechanism housing 165 of the mid-section 135 and a stud installed to the base section 110, upon assembly of the mid-section to the base section the stud will pass through the stud hole 185 in the locking mechanism housing and enter the cam screw hole, whereafter the stud may be engaged by rotation of the cam screw and the base section and mid-section of the power pack housing 105 may be pulled tightly together.

During installation of the locking mechanism in one exemplary motorized version of a drone power pack 100, a cam screw is first inserted into the cam screw hole 175, then a cam screw motor may be installed and pushed onto a motor coupling interface associated with the cam screw (see above). The motor may then be fastened into the housing mid-section 135, such as by standard fasteners for the motor chosen, or by another acceptable fastening means. By inserting the cam screw first, then sliding the motor shaft into or onto the motor coupling interface, the bottom portion 160 of the housing mid-section 135 may be kept compact in size.

The housing mid-section 135 of the exemplary drone power pack 100 also includes a pathway between the top portion 140 and bottom portion 160 thereof. In this exemplary embodiment, the pathway is comprised of two access holes 190, 195. The access holes 190, 195 provide a pathway by which the power connector block portion 200 located within the lower portion 160 of the housing mid-section 135 may be connected via wiring to the electrical energy storage device residing in the compartment 155 in the top portion 140 of the housing mid-section 135, and to also allow a locking/unlocking motor located within the lower portion of the housing mid-section and coupled to the cam screw of the locking mechanism to be controlled from outside the power pack housing 105 by way of motor connectors on the housing lid section 205 (as described in more detail below).

As shown in the drawing figures and discussed above, this exemplary power connector block is provided in two parts, with the first part 125 residing on the housing base section 110 and the second, cooperating, part 200 residing in the bottom portion 160 of the housing mid-section 135, although it may be possible to reverse this arrangement in other embodiments.

The assembled power connector block provides an electrical connection. Preferably, the power connector block is designed to handle high current loads as drone motors at times draw considerable current. It is also desirable that the power connector block provide a low-insertion force connection, and that the power connector block provide a vibration resistant connection, as drone motors can produce considerable vibration at high oscillation frequencies.

Generally speaking, the power connector block portion 125 residing on the base section 110 in this exemplary embodiment is comprised of two flat copper (or other conductive material) blades that are affixed to a nonconductive block, such as may be constructed of plastic or some other type of nonconductive material. Leads (e.g., wires in this embodiment) are attached to the blades with their opposite ends connecting to the main power leads of the drone to which the base section 110 of the power pack 100 is attached. The power connector block portion 200 residing in the mid-section 135 may be similar in construction to the power connector block portion 125 on the base section, except that the conductive blades thereof are preferably spring loaded, and nonconductive straps (that may be integral to the block) may be provided to hold the blades in place. Such an exemplary construction allows the blades in the mid-section portion 200 of the power connector block to float so that when the two power connector portions are brought together, the top blades of the base section portion 125 of the power connector block can nearly perfectly align themselves with the bottom blades of the mid-section portion 200 of the power connector block (courtesy of the springs). To produce a tight and capable connection, the blade material, spring forces (to accommodate vibration issues) and blade surface area (to increase amperage capacity) may be varied as needed.

The bottom section 160 of the housing mid-section 135 may also have another set of connectors for auxiliary purposes. For example, some battery type power sources require that individual cells be either monitored when charging, or charged individually. Such an auxiliary connector may be used to provide this functionality.

Still further, and although not shown in the current drawing figures, the exemplary drone power pack 100 may include another electrical (e.g., communications) connector assembly that allows for drone communications with at least certain versions of the power pack 100. For example, when the electrical energy storage device utilized by the exemplary drone power pack 100 is a "smart" battery, an associated drone may be able to communicate with the battery to ascertain electrical energy storage levels, etc. In one exemplary embodiment, the communications connector is provided in two parts, with one part residing on the housing base section 110 and electrically connected to appropriate drone componentry, and a mating part residing in the bottom portion 160 of the housing mid-section 135 and electrically connected to an appropriate connector on the smart battery. As with the above-described power connector, the first part and second part of the communications connector are located so as to be placed in electrical communication when the housing mid-section 135 is assembled to the housing base section 110. The particular design of the communications connector may vary. In one non-limiting exemplary embodiment, the communications connector may be comprised of a set of electrically conductive pads located on the housing base section 110 and a corresponding set of spring-loaded pins located in the bottom portion 160 of the housing mid-section 135. As the housing mid-section 135 is assembled to the housing base section, the pins make contact with the pads and an electrical connection is created between the associated drone and the smart battery of the power pack 100.

Figure 7:
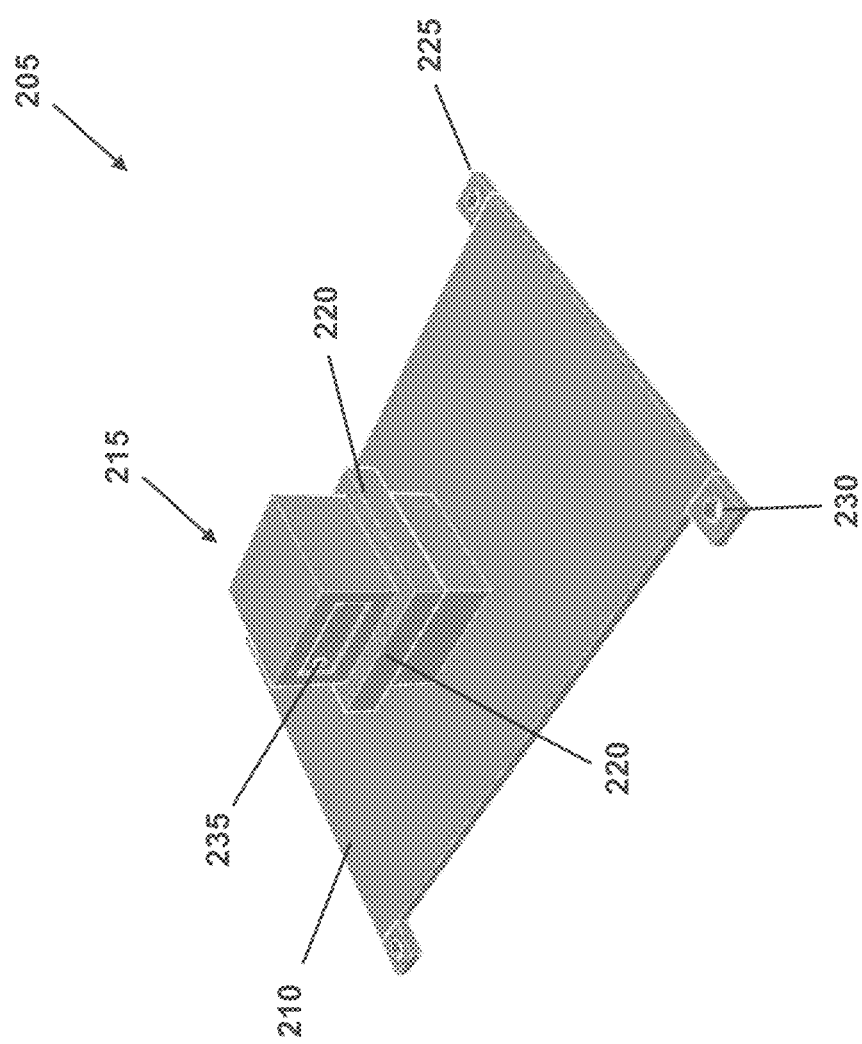
FIG. 7 is an enlarged view of the lid section shown in FIG. 3C.

An enlarged view of the exemplary housing lid section 205 is shown in FIG. 7. The lid section 205 of the power pack housing 105 functions, most basically, to seal the top side of the housing mid-section 135 and the power source compartment 155 located therein.

It can be seen that the exemplary lid section 205 includes a plate-like cover portion 210 and an upwardly extending end effector engaging portion 215. The cover portion 210 mates with and seals against a mating face 140a of the mid-section top portion 140. The end effector engaging portion 215 is designed to be an engagement point for a mechanical device such as but not limited to the gantry crane 50 of the above-described drone base 5 equipped with an appropriate end effector such as but not limited to the gripper 55. To this end, the end effector engaging portion 215 of the lid section 205 includes particular engagement features that permit the end effector being used to securely grip the engagement features and to separate the lid section 205 and mid-section 135 of the housing 105 from the base section 110 of the housing, such as but not limited to for purposes of recharging the power pack 100, etc. In this particular power pack embodiment, the engagement features provided on the exemplary end effector engaging portion 215 are gripper ledges 220, which may be securely engaged by, for example, an end effector such as the gripper 55 of the drone base gantry crane 50.

In this exemplary embodiment, attachment of the lid section 205 to the top portion 140 of the mid-section 135 is accomplished by providing the lid section with attachment tabs 225 having screw holes 230 that are located to align with the holes 150 in the bosses 145 provided on the top portion 140 of the mid-section, and by attaching the lid to the mid-section with appropriate screws that pass through and into said holes. A variety of other releasable attachment techniques may be employed in other embodiments, as would be well understood by one of skill in the art.

Figure 8:
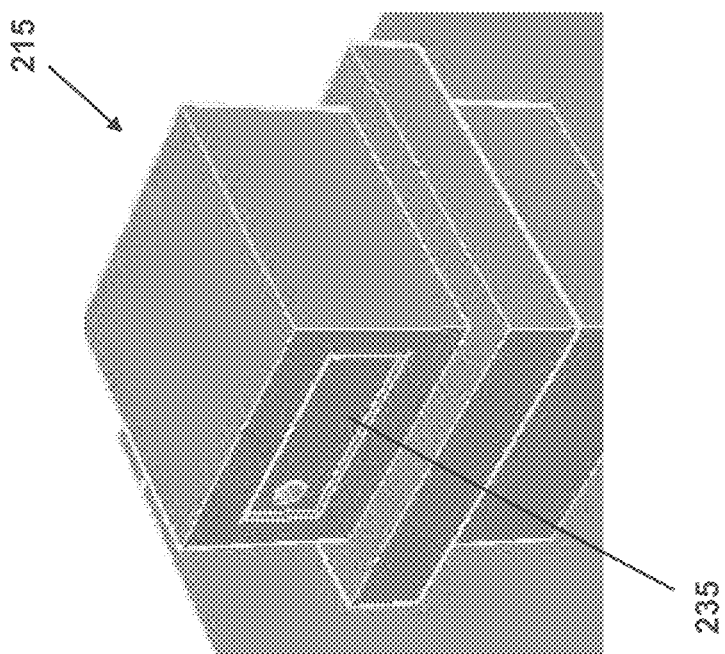
FIG. 8 is an enlarged view of a portion of the lid section shown in FIG. 7.

As can be observed in FIG. 7 and the enlarged partial view of FIG. 8, the end effector engaging portion 215 of the lid section 205 may also include one or more (three, in this case) motor control connectors 235. The motor control connectors permit a controlling mechanism such as a properly modified end effector of a crane or robotic arm (e.g., the gripper 55 of the drone base gantry crane 50) to supply electrical energy to the motor associated with the cam screw of the power pack housing locking mechanism located within the mid-section 135 of the power pack housing 105, so as to operate the locking mechanism to lock/unlock the combined lid section 205 and mid-section 135 to/from the base section 110 when needed, as has been described in more detail above. In this regard, the end effector used would also have motor control connectors that correspond to and electrically couple to the motor control connectors 235 of the lid section end effector engaging portion 215 when the end effector is engaged therewith. The motor control connectors of the end effector would also be in electrical communication with a source of electrical energy, such as the power supply of the associated transfer device or a separate power supply, so as to provide electrical energy to the power pack locking mechanism motor via the motor control connectors 235 and associated wiring that connects the motor control connectors 235 on the end effector engaging portion 215 of the lid section 205 to the locking mechanism motor through one or both of the access holes 190, 195 in the housing mid-section 135.

Figure 9:
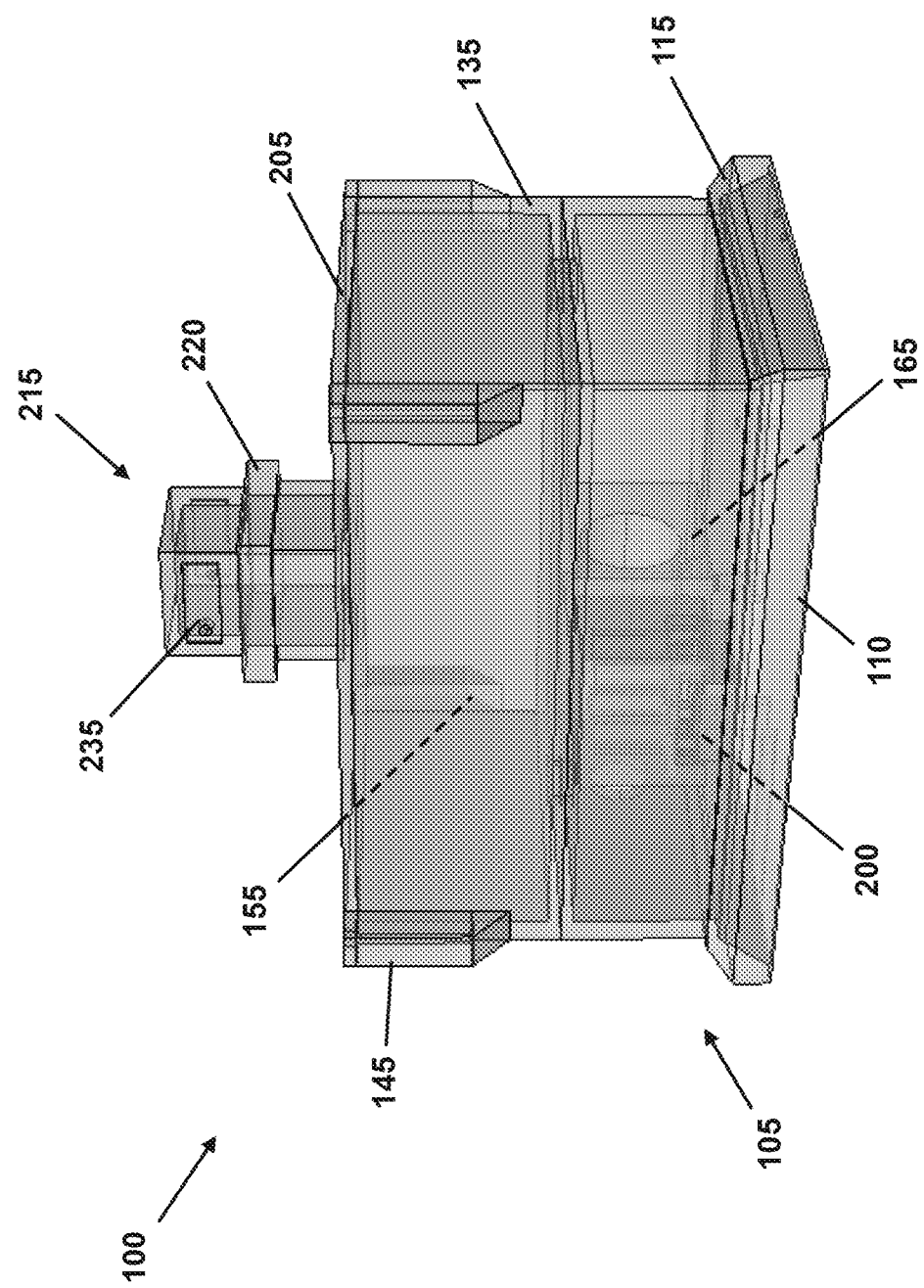
FIG. 9 is an assembled and semi-transparent isometric view of an exemplary drone power pack.

FIG. 9 depicts the assembled exemplary drone power pack 100 in partial transparency. The various internal subcomponents associated with each of the drone housing sections 110, 135, 205 and discussed above may be observed in FIG. 9 in their assembled positions and, at least in some cases, with respect to their association and/or engagement with the subcomponents of other housing sections.

Figure 10A:
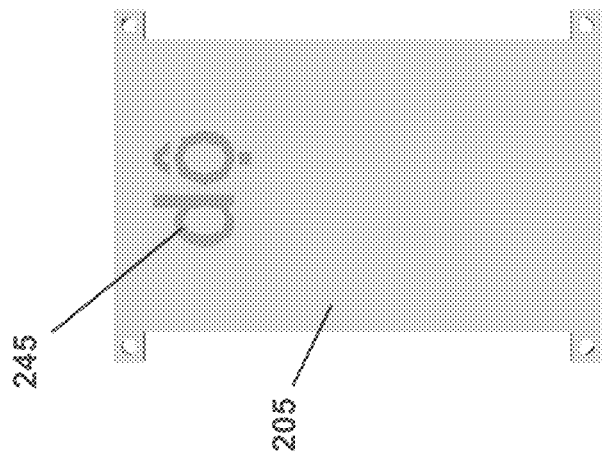
FIG. 10A is an enlarged top view of the housing base section shown in FIG. 3A.
Figure 10B:
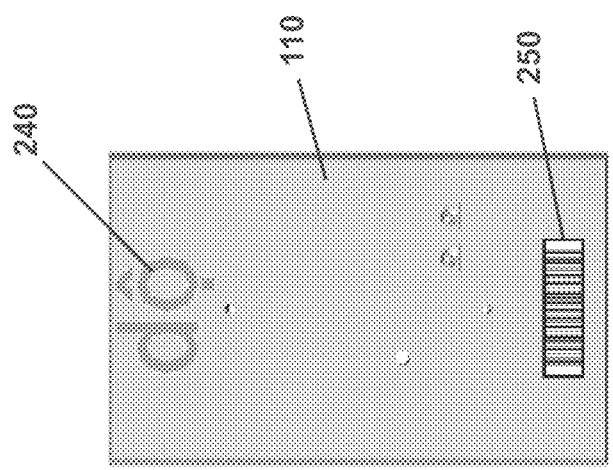
FIG. 10B is an enlarged top view of the housing lid section shown in FIG. 3C, with exemplary alignment markings depicted thereon.

FIGS. 10A and 10B are illustrative of the aforementioned exemplary identifying alignment marks 240, 245 or other features that may be placed on, among other locations, a top side of the base section 110 (shown without the power connector block portion 125 for clarity) as well as a top side of the lid section 205 (shown without the end effector engaging portion 215 for clarity) of the power pack housing 105, for use by one or more subsystems of a drone base. For example, the subsystems may be the aforementioned gantry crane 50 and the vision subsystem 60 and/or spatial alignment subsystem of the drone base 5, or some other sensing device capable of locating an identifying alignment mark or other alignment feature so as to properly orient and align an associated end effector with the lid section 205 or base section 110 of the power pack 100.

In the former case, the identifying alignment mark 240 or other alignment feature located on the base section 110 may be used to align an assembled housing lid section 205 and mid-section 135 of the power pack 100 with the housing base section 110 when the base section is already attached to a drone, such as during a drone power source repowering operation. In the latter case, the identifying alignment mark 245 or other alignment feature on the lid section 205 may be used, for example and without limitation, to facilitate proper alignment of the gripper 55 of the gantry crane 50 (or some other end effector) with the end effector engaging portion 215 of the housing lid section 205 for the purpose of separating the lid section and housing mid-section 135 from the base section 110 of the power pack 100 (such as during a drone power source repowering operation), to separate a non-secured lid section from an associated mid-section, or to move a drone to which the assembled power pack 100 is attached from one location to another location within a drone base such as the exemplary drone base 5 of FIG. 1.

As also illustrated in FIG. 10A, a drone or unit identification mark 250 may also be located on the power pack housing base section 110, lid section 205, or elsewhere, for purposes of identifying and inventorying drones. Such a unit identification mark may be, for example, a bar code (as shown), a RFID tag, etc. Similar identification marks may also be placed on other components of a drone, drone power pack, and/or drone base, for purposes of identification, inventory, etc.

What is claimed is:

1. A drone operations support base for supporting multiple drones, comprising:
- an enclosure having a drone support floor;
- an entryway in said enclosure for permitting drone ingress and egress;
- a common drone launching and landing surface located within the enclosure, the common drone launching and landing surface located and configured to support all takeoffs and landings of the multiple drones associated with the drone operations support base;
- a shared drone storage area located within the enclosure, the shared drone storage area separate from the common drone launching and landing surface and divided into multiple drone storage spaces that are configured to store the multiple drones associated with the drone operations support base, where the drone storage spaces are storage spaces of dynamically redefinable dimensions and arrangement;
- a drone power source repowering area located within the enclosure, the drone power source repowering area configured to receive and repower drone power sources separately from the drones;
- a mechanical transfer device having access to the common drone launching and landing surface, the shared drone storage area and the drone power source repowering area, the mechanical transfer device configured to:
  - move drones between the common drone launching and landing surface and the shared drone storage area,
  - remove a drone power source from a drone,
  - transfer a drone power source removed from a drone to the drone power source repowering area for repowering,
  - transfer a repowered drone power source from the drone power source repowering area to other areas of the drone support platform, and
  - install a repowered drone power source into a drone lacking a power source;
- a computerized base control system for controlling base operations;
- a flight control subsystem in communication with the base control system, the flight control subsystem configured to manage drone takeoffs and landings; and
- a logistics subsystem in communication with the base control system, the logistics subsystem configured to maintain drone inventory, and to manage drone storage.

2. The drone operations support base of claim 1, further comprising a cover that is selectively operable to open or close the entryway so as to permit or deny drone ingress and egress with respect to the enclosure.

3. The drone operations support base of claim 1, further comprising GPS functionality that permits the drone operations support base to autonomously determine the geographic location of the drone operations support base.

4. The drone operations support base of claim 1, wherein at least a portion of the drone support floor within the drone storage area of the enclosure is electrically conductive and configured to transfer electrical energy to drones supported thereon through direct contact between the flooring and conductive elements on the drones.

5. The drone operations support base of claim 1, further comprising a drone retention feature selected from the group consisting of mechanical clamps and a magnetic drone support platform that is functional to attract opposite polarity magnetic elements or ferrous metal elements of drones supported thereon so as to releasably secure said drones to the floor.

6. The drone operations support base of claim 1, further comprising:
- a machine vision subsystem in communication with at least the mechanical transfer device, the machine vision subsystem configured to detect and analyze identifying alignment marks on drones or drone support equipment located on the drone support floor; and
- a spatial alignment subsystem in communication with at least the machine vision subsystem and the mechanical transfer device, the spatial alignment subsystem configured to locate particular features of an alignment mark on a drone or on drone support equipment and to use said features of the alignment mark to direct movement of the mechanical transfer device into proper alignment with a grippable feature of the drone;
- wherein the machine vision subsystem and the spatial alignment subsystem are under control of the computerized base control system.

7. A drone operations support base for supporting multiple drones, comprising:
- an enclosure having side walls and a drone support floor;
- an entryway in said enclosure for permitting drone ingress and egress;
- a sliding roof panel that is selectively operable to open or close the entryway so as to permit or deny drone ingress and egress with respect to the enclosure;
- a common drone launching and landing surface located within the enclosure, the common drone launching and landing surface located and configured to support all takeoffs and landings of the multiple drones associated with the drone operations support base;
- a shared drone storage area located within the enclosure, the shared drone storage area separate from the common drone launching and landing surface and divisible into multiple drone storage spaces that are configured to store the multiple drones associated with the drone operations support base;
- a drone power source repowering area located within the enclosure, the drone power source repowering area configured to receive and repower drone power sources separately from the drones;
- a mechanical transfer device in the form of a translatable gantry crane equipped with an end effector and having access to the common drone launching and landing surface, the shared drone storage area and the drone power source repowering area, the gantry crane configured to:
  - move drones between the common drone launching and landing surface and the shared drone storage area,
  - remove a drone power source from a drone,
  - transfer a drone power source removed from a drone to the drone power source repowering area for repowering,
  - transfer a repowered drone power source from the drone power source repowering area to other areas of the drone support platform, and
  - install a repowered drone power source into a drone lacking a power source;
- a computerized base control system for controlling base operations;
- a flight control subsystem in communication with the base control system, the flight control subsystem configured to manage drone takeoffs and landings; and a logistics subsystem in communication with the base control system, the logistics subsystem configured to maintain drone inventory, and to manage drone storage.

8. The drone operations support base of claim 7, wherein at least a portion of the drone support floor within the drone storage area of the enclosure is electrically conductive and configured to transfer electrical energy to drones supported thereon through direct contact between the flooring and conductive elements on the drones.

9. The drone operations support base of claim 7, wherein the drone storage spaces are virtual storage spaces, the dimensions and arrangement of which are dynamically redefinable.

10. The drone operations support base of claim 7, further comprising GPS functionality that permits the drone operations support base to autonomously determine the geographic location of the drone operations support base and to transmit said geographic location to drones.

11. The drone operations support base of claim 1, wherein the common drone launching and landing surface is selected from the group consisting of an elevated platform and a suspended structure.

12. The drone operations support base of claim 7, wherein the common drone launching and landing surface is selected from the group consisting of an elevated platform and a suspended structure.

13. The drone operations support base of claim 1, further comprising a machine vision subsystem in communication with at least the mechanical transfer device, the machine vision subsystem configured to detect and analyze identifying alignment marks on drones or drone support equipment located on the drone support floor.

14. The drone operations support base of claim 13, wherein the machine vision subsystem is under control of the computerized base control system.

15. The drone operations support base of claim 13, further comprising a spatial alignment subsystem in communication with at least the machine vision subsystem and the mechanical transfer device, the spatial alignment subsystem configured to locate particular features of an alignment mark on a drone or on drone support equipment and to use said features of the alignment mark to direct movement of the mechanical transfer device into proper alignment with a grippable feature of the drone.

16. The drone operations support base of claim 15, wherein the spatial alignment subsystem is under control of the computerized base control system.

17. The drone operations support base of claim 1, wherein the mechanical transfer device is selected from the group consisting of a gantry crane equipped with an end effector and a multi-axis robotic arm equipped with an end effector.

18. The drone operations support base of claim 7, further comprising a drone retention feature, the drone retention feature selected from the group consisting of mechanical clamps and a magnetic drone support floor within the enclosure that is functional to attract opposite polarity magnetic elements or ferrous metal elements of drones supported thereon so as to releasably secure said drones to the drone support floor.

19. The drone operations support base of claim 7, further comprising a machine vision subsystem in communication with at least the mechanical transfer device, the machine vision subsystem configured to detect and analyze identifying alignment marks on drones located on the drone support platform.

20. The drone operations support base of claim 19, further comprising a spatial alignment subsystem in communication with at least the machine vision subsystem and the mechanical transfer device, the spatial alignment subsystem configured to locate particular features of an alignment mark on a drone and to use said features of the alignment mark to direct movement of the mechanical transfer device into proper alignment with a grippable feature of the drone.

21. The drone operations support base of claim 1, further comprising a drone service/maintenance area.

22. The drone operations support base of claim 7, further comprising a drone service/maintenance area.

* * * * *